Sept. 18, 1956 E. M. ELMER 2,763,052

METHOD OF FORMING A MOTOR ARMATURE AND CORE ASSEMBLY

Filed Jan. 22, 1953 11 Sheets-Sheet 1

EDWARD M. ELMER,
INVENTOR.

BY R. E. Geauque

ATTORNEY

Sept. 18, 1956 E. M. ELMER 2,763,052

METHOD OF FORMING A MOTOR ARMATURE AND CORE ASSEMBLY

Filed Jan. 22, 1953 11 Sheets-Sheet 2

EDWARD M. ELMER,
INVENTOR.

BY R. E. Geauque

ATTORNEY

METHOD OF FORMING A MOTOR ARMATURE AND CORE ASSEMBLY

Filed Jan. 22, 1953

EDWARD M. ELMER,
INVENTOR.

BY R. E. Geauque
ATTORNEY

METHOD OF FORMING A MOTOR ARMATURE AND CORE ASSEMBLY

Filed Jan. 22, 1953

EDWARD M. ELMER,
INVENTOR.

BY R. E. Geauque

ATTORNEY

Sept. 18, 1956 E. M. ELMER 2,763,052

METHOD OF FORMING A MOTOR ARMATURE AND CORE ASSEMBLY

Filed Jan. 22, 1953 11 Sheets-Sheet 5

EDWARD M. ELMER,
INVENTOR.

BY R. E. Geauque

ATTORNEY

EDWARD M. ELMER,
INVENTOR.

BY R. E. Geauque

ATTORNEY

METHOD OF FORMING A MOTOR ARMATURE AND CORE ASSEMBLY

EDWARD M. ELMER,
INVENTOR.

BY R. E. Geauque

ATTORNEY

EDWARD M. ELMER,
INVENTOR.

BY R. E. Grangue

ATTORNEY

Sept. 18, 1956 E. M. ELMER 2,763,052

METHOD OF FORMING A MOTOR ARMATURE AND CORE ASSEMBLY

Filed Jan. 22, 1953 11 Sheets-Sheet 9

EDWARD M. ELMER,
INVENTOR.

BY R. S. Grangue

ATTORNEY

METHOD OF FORMING A MOTOR ARMATURE AND CORE ASSEMBLY

Filed Jan. 22, 1953

EDWARD M. ELMER,
INVENTOR.

BY K. E. Seaquist

ATTORNEY

Sept. 18, 1956
E. M. ELMER
2,763,052
METHOD OF FORMING A MOTOR ARMATURE AND CORE ASSEMBLY
Filed Jan. 22, 1953
11 Sheets-Sheet 11
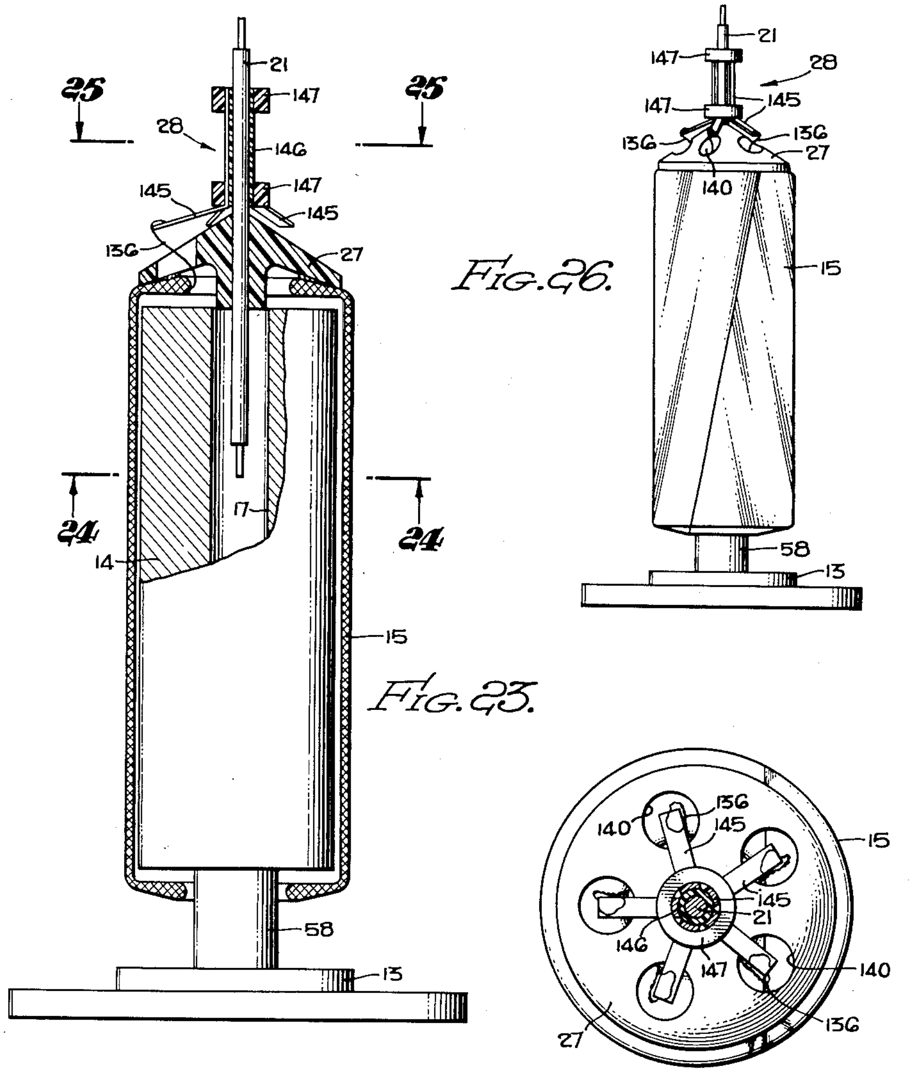
FIG. 23, FIG. 26
FIG. 25.
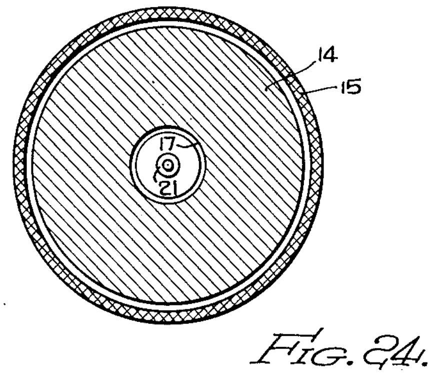
FIG. 24.
EDWARD M. ELMER,
INVENTOR.
BY R. E. Geauque
ATTORNEY United States Patent Office 2,763,052

Patented Sept. 18, 1956

2,763,052

METHOD OF FORMING A MOTOR ARMATURE AND CORE ASSEMBLY

Edward M. Elmer, Santa Monica, Calif., assignor to Summers Gyroscope Company, Santa Monica, Calif., a corporation of California Application January 22, 1953, Serial No. 332,688

9 Claims. (Cl. 29—155.5)

This invention relates to a low inertia motor and to a method of constructing the armature for such a motor. More particularly, the invention relates to an electric motor having an especially constructed armature which provides a high torque to inertia ratio so that the motor can run on minute voltages, and the speed of the motor can closely follow transient voltages.

In electric motors of conventional design, a high torque to inertia ratio is impossible because of the existence of high armature inertia and high eddy current and friction losses. These objections can be largely overcome by utilizing an armature which has a minimum of mass because the armature is impregnated with a non-conducting material and therefore self-supporting, by having no movable iron in relation to the magnetic flux, and by the use of low friction bearings. Such an armature is disclosed in patent application Serial Number 285,928, filed May 3, 1952, by Edward M. Elmer, now Patent 2,721,284, issued October 18, 1955. However, the method of assembling this armature requires the use of a number of jigs and fixtures and the motor is, therefore, not particularly suitable for mass production techniques.

The present invention relates to a high torque to inertia motor which has a self-supported armature winding because of the fact that the winding is impregnated with a plastic, and is of such a configuration that it can be easily and quickly machine wound. This type of armature winding is made possible since the armature wire can be wound continuously and directly upon the magnetic core of the motor and thereafter the armature and core remain an integral part of the assembly. In order to provide an air gap between this self-supporting armature and the core, provision is made for coating the core with a material which can be accurately machined and later removed from between the armature and the core. Thus the core and armature can be accurately positioned with respect to each other and be concentric about the axis of rotation of the armature. Since the armature consists of only several layers of wire, it is therefore very lightweight and can be suspended at one end only by cantilever bearings. Thus it is possible to have the armature rotate independently of the core even though these two parts cannot be disassembled from one another.

Because of the fact that the armature can be continuously machine wound, it is possible to eliminate the use of individual coil bundles which must be overlapped and held in a correctly oriented position until the coils are firmly secured together. This overlapping of the coil bundles would tend to increase the overall inertia of the armature winding.

In connection with the method of this invention covering the machine winding of the armature, a winding machine is utilized which provides for bodily rotation of the core while it is being wound and, also, for intermittent rotation of the core about its own axis. In this connection, means are provided to accurately index the commutator leads so that the winding can be divided into the equivalent of a number of equally spaced coils. This indexing means can be adjustable to take care of varying numbers of coils and varying diameters of armature wire. This winding machine is suitable for mass production of the armatures of this invention and can be operated by those not especially skilled in motor manufacture.

It is therefore an object of this invention to provide a lightweight, self-supporting armature which is non-magnetic and which can be formed by continuously winding the armature wire upon the armature core.

Another object of the invention is to provide a method whereby the armature core can be coated and thereafter accurately machined so that the armature wound upon the coating for the core will be correctly centered and positioned with respect to the core.

A further object of this invention is the provision of a method whereby an expendable armature and core is produced in which no provision is made for disassembling the armature from around the core.

A still further object of the invention is the provision of continuously winding the armature wire about a coated core and applying commutator leads to said windings so that the equivalent of a number of equally spaced coils are provided.

Another object of the invention is to provide a method of winding the armature on the core of the motor which includes bodily rotating the core as well as intermittently rotating the core about its own axis.

A still further object of the invention is the provision of a winding machine which mounts the armature core for both bodily rotation and intermittent rotation about its own axis and which has means for maintaining proper tension of the armature wire during winding.

Another object of the invention is to provide a winding machine with means for indexing the windings applied to the core by the machine so that the commutator leads can be properly applied to the armature.

These, and other objects not specifically enumerated above, will become readily apparent to those skilled in the art in connection with the following specifications and drawings in which.

Figure 13:
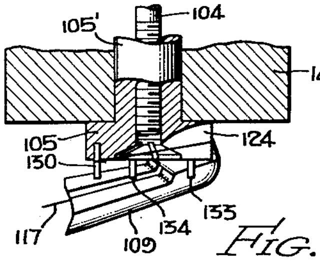
Figure 12:
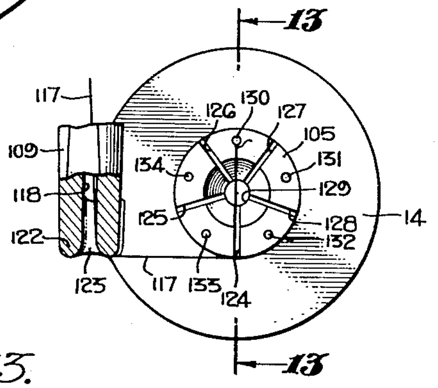
Fig. 12 is a view taken along line 12—12 of Fig. 11 showing the armature wire in position to start the winding of the core.

Fig. 13 is a cross-sectional view taken along line 13—13 of Fig. 12 illustrating the manner in which the armature wire is secured to the tying hub.

Figure 14:
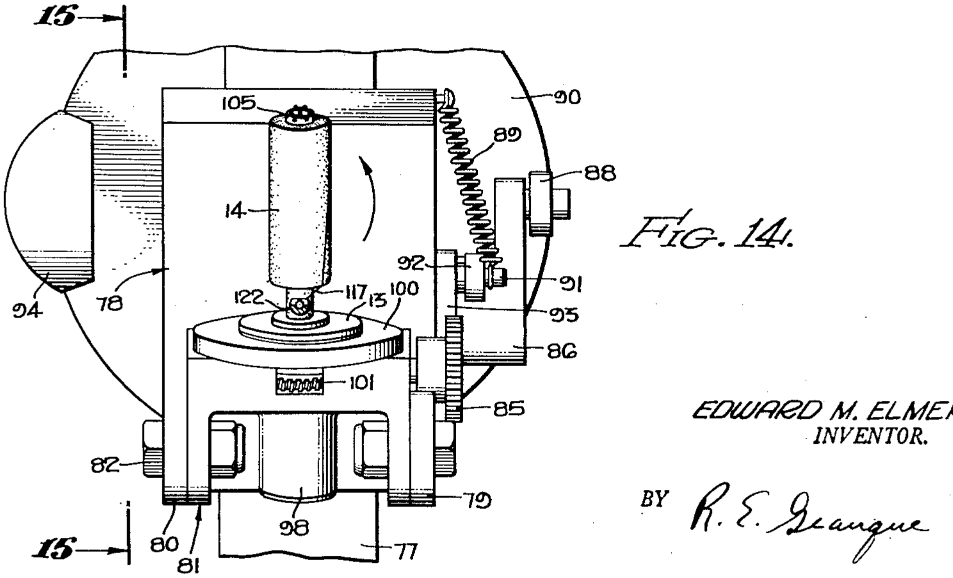

Fig. 14 illustrates the position of the armature winding on the core after the winding shaft has made one-half revolution.

Figure 15:
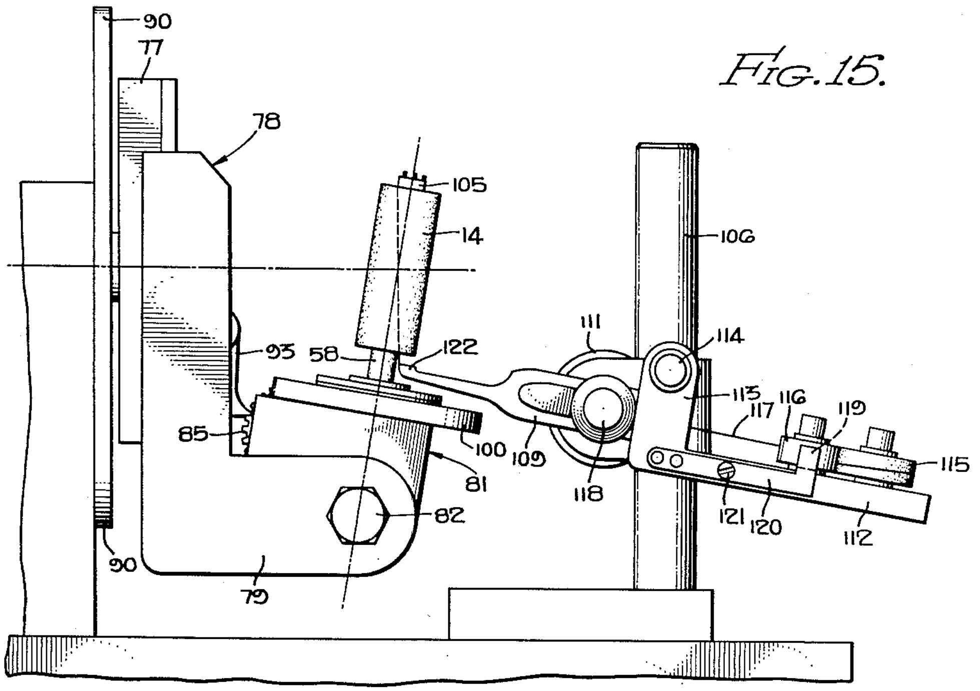

Fig. 15 is a side elevational view along line 15—15 of Fig. 14.

Figures 16, 17:
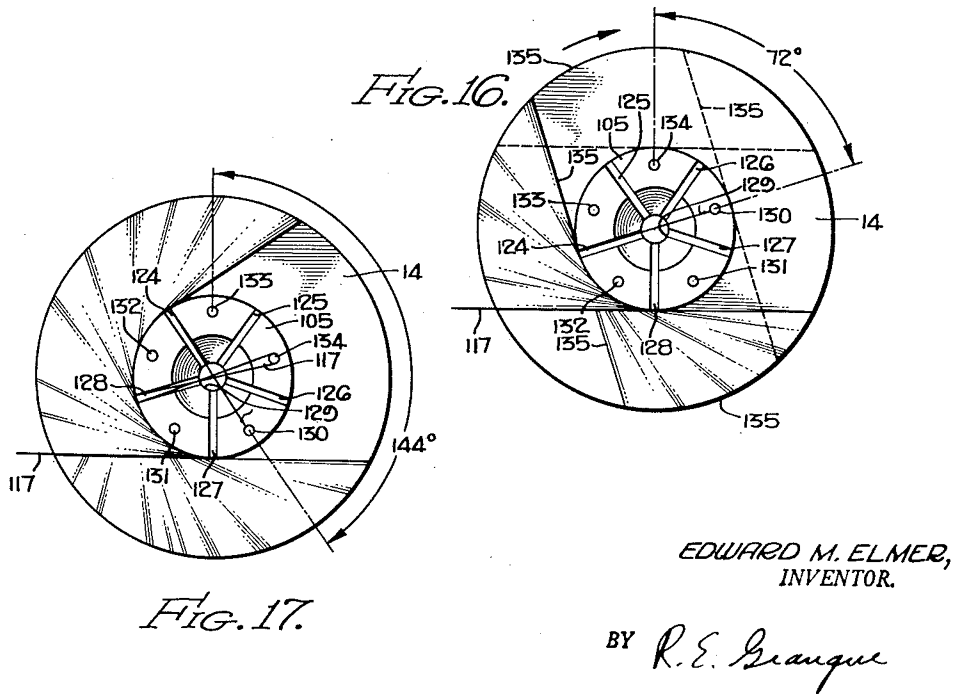

Fig. 16 is an end view of the tying hub end of the core after 72 degrees of the rotation of the winding platform.

Fig. 17 is a view of the tying hub end of the core after the winding platform has been rotated 144 degrees and illustrates the manner in which the winding is looped around and tapped to pins on the tying hub after each 72 degrees of revolution.

Figure 18:
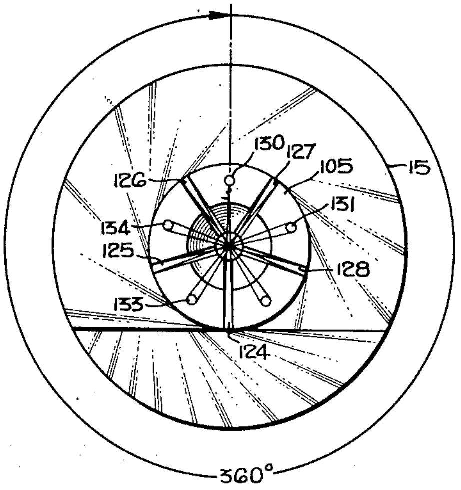

Fig. 18 is a view of the tying hub end of the core after 360 degrees of rotation of the winding platform and shows the manner in which the winding is secured to the tying pins in order to provide five equally spaced connections.

Figure 19:
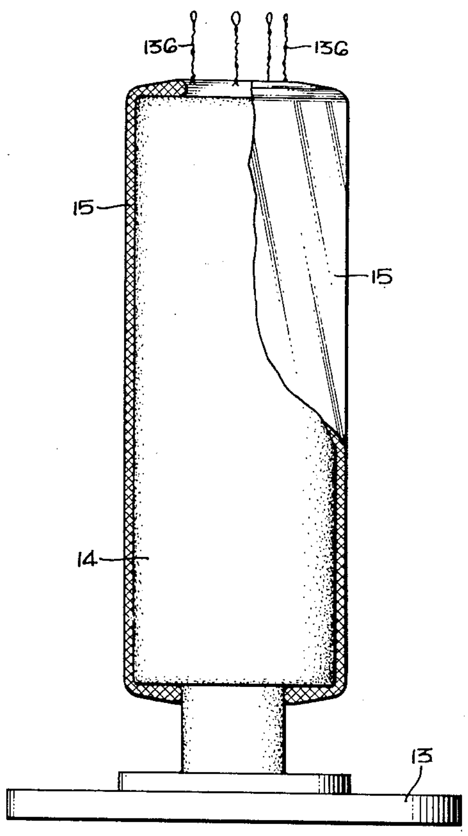

Fig. 19 is a view of the completely wound core after the commutator leads have been lifted off the tying pins and the tying hub removed.

Figure 20:
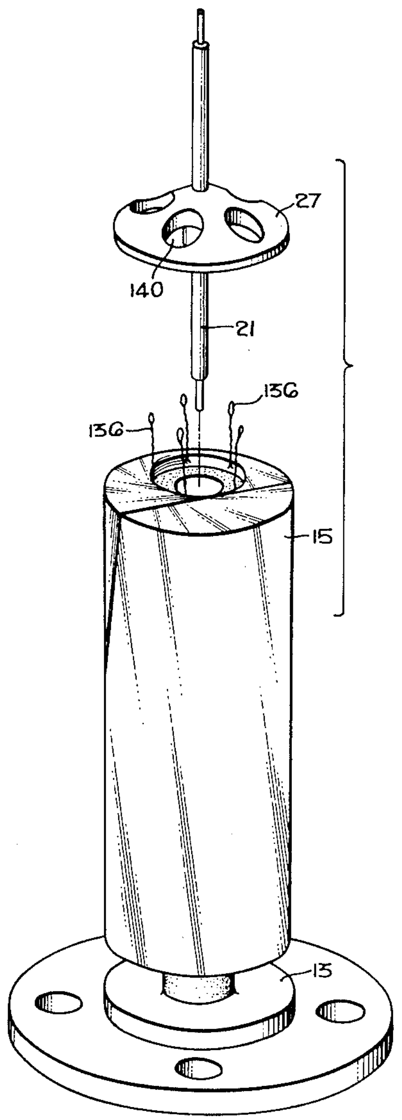

Fig. 20 is an extended view of the armature shaft assembly.

Figure 21:
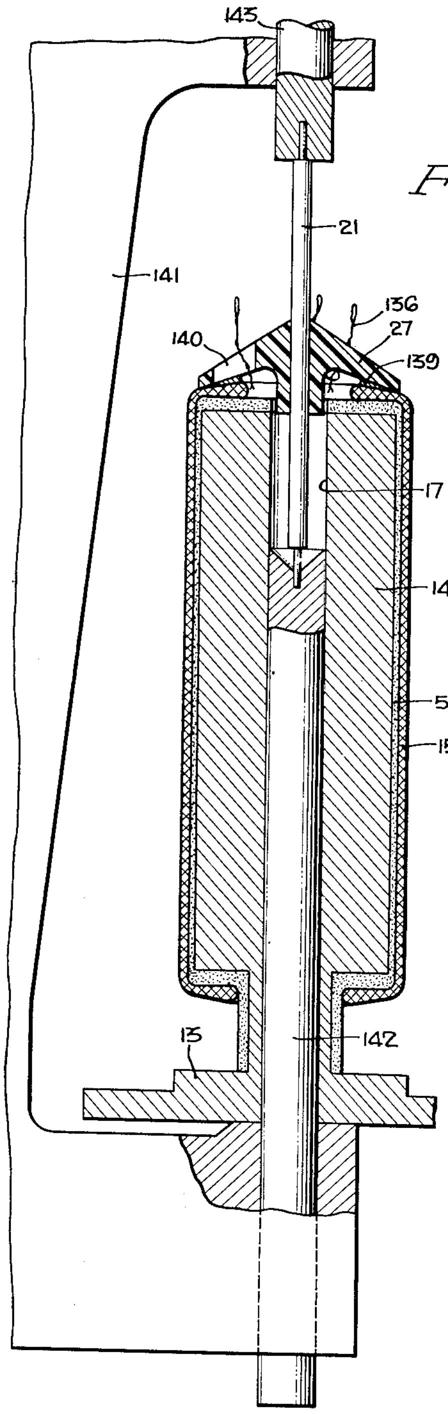

Fig. 21 is a view of the armature shaft and wound core assembled in a jig in order to align the armature shaft with the axis of the winding and secure the armature hub to the winding.

Figure 22:
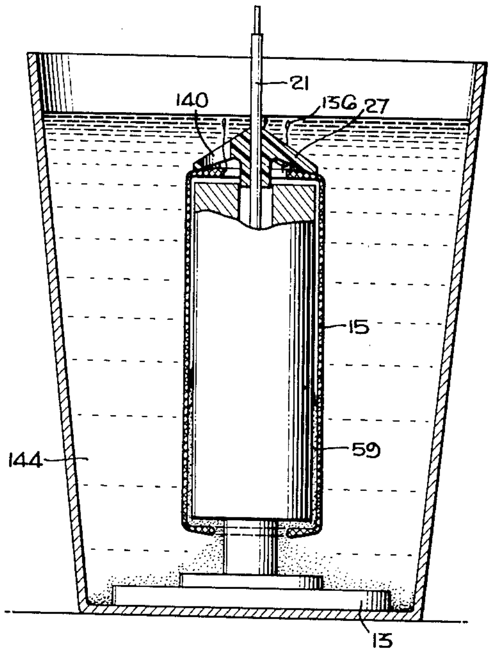

Fig. 22 is a cross-sectional view of the armature winding and core during the time it is positioned in a caustic etch bath to remove the aluminum separating the armature winding from the core.

Fig. 23 is a cross-sectional view of the armature winding surrounding the core and with the commutator mounted on the armature shaft.

Fig. 24 is a cross-sectional view along line 24—24 of Fig. 23 illustrating the space which completely separates the armature winding from the core.

Fig. 25 is an end view along line 25—25 of Fig. 23 illustrating the commutator leads of the armature soldered to the commutator bars.

Fig. 26 is a plan view of the completed armature assembly.

The embodiment of the present invention chosen for illustration comprises a casing 1 for housing the gear train for the motor, and the casing is closed at one end by plate 2 secured to the casing by screws 2′. A pair of aluminum members 3 and 4 are secured to and extend from casing 1, and pole pieces 5 and 6 are supported between and extend outwardly with the aluminum members. A semi-circular permanent magnet 7 has its ends in contact with one side of pole pieces 5 and 6 while another semi-circular permanent magnet 8 has its ends in contact with the opposite sides of pole pieces 5 and 6. The magnet 7 is held in position by screw 9 threaded into member 3, and the magnet 8 is held in position by screw 10 threaded into member 4. The members 3 and 4 have a plate 11 secured at their ends, and this plate has four threaded openings for receiving screws 12 which serve to support base plate 13 of core 14. The space between members 3 and 4 and the space between pole pieces 5 and 6 provide an opening for receiving core 14 and armature 15, which surrounds the core. Thus, the core 14, which is substantially cylindrical, is rigidly held by the casing 1, and magnetic flux will pass from the poles of the magnets on one side of the armature through the pole pieces and to the poles of the magnets on the other side of the armature, and thereby produce a stationary field for the armature.

A shaft 16 extends through the center opening 17 in both the base plate 13 and core 14 and is held therein by a press fit. This shaft has an opening 18 at one end which supports end bearing 19 and bearing 20 for one end of armature shaft 21. The other end of the armature shaft is mounted by end bearing 22 and bearing 23 positioned in an opening 24 in frame section 25, which frame section is secured to casing 1 by means of screws 26. An insulated armature hub 27 has an opening for receiving shaft 21, and this hub is rigidly secured to the armature around its circumference. Thus the armature 15 is mounted for rotation between the pole pieces and the core. A commutator 28 is likewise secured to shaft 21 and has five commutator bars which are insulated from the shaft and from each other and which connect with the five commutator leads of the motor. Power is supplied to the motor from commutator brushes 29 which are connected with the power source led into the casing 1.

A small gear 30 is mounted on the end of shaft 21 adjacent to bearing 23 and drives a large gear 31 which is mounted on a shaft 32. This shaft has its end supported by bearings 33 and 34, respectively, carried by frame sections 35 and 36 which are rigidly secured to casing 1. A small gear 37 rotates with shaft 32 and drives a large gear 38 mounted on a shaft 39 which is likewise supported by frame members 35 and 36. Shaft 39 carries a small gear 40, which meshes with a large gear 41 which has an opening so that the gear 41 can be press fitted onto hub 42. This hub is rotatable on a shaft 43 which has a reduced section press fitted into an opening in frame section 35, and the end of the reduced section passes into opening 24. The gear 41 carries a conducting plate 44 which is secured thereto by rivets 45 and 46. A spring 47 is integral with plate 44 and continually bears against conducting pin 48 which is mounted by plate 49 secured by screws 50 to end plate 2. The end plate 2 likewise carries a potentiometer winding 51 which is supplied with electrical energy through contacts 53 and 54. The plate 44 carries a wiper arm 55 which has a wiper 56 bearing against winding 51, and the potential at wiper 56 is taken off pin 48 by plate 57.

Thus the motor of this invention can be used to adjust a potentiometer, and because of the reduction gearing between the motor shaft and the potentiometer, very little power is required for the motor to move the wiper 56. Because of the construction of the motor armature, which will be later described, the motor has a high torque to inertia ratio and low eddy current and friction losses which makes it possible for the motor to run on minute voltages and for the speed of the motor to closely follow transient voltages.

Figure 1:
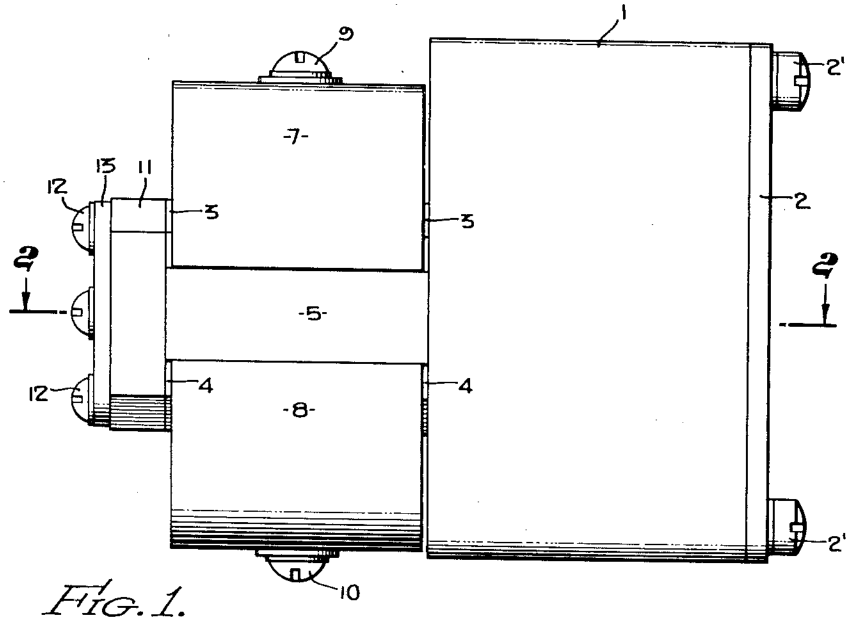
Fig. 1 is a side elevation view of the casing for the low inertia motor of this invention.
Figure 2:
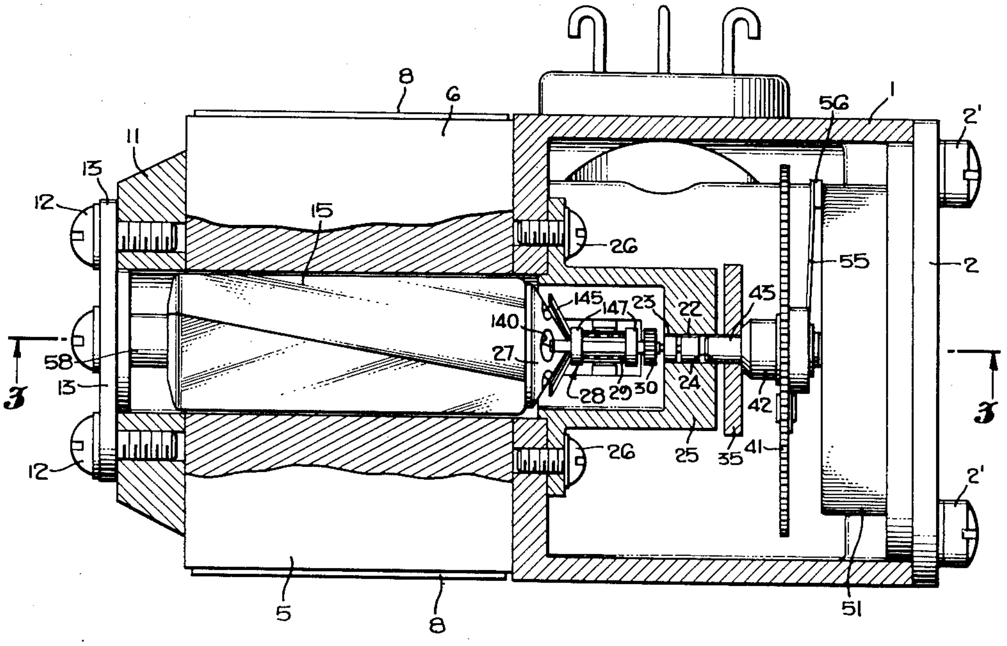
Fig. 2 is a horizontal sectional view along line 2—2 of Fig. 1 showing the motor and gear assembly.
Figure 3:
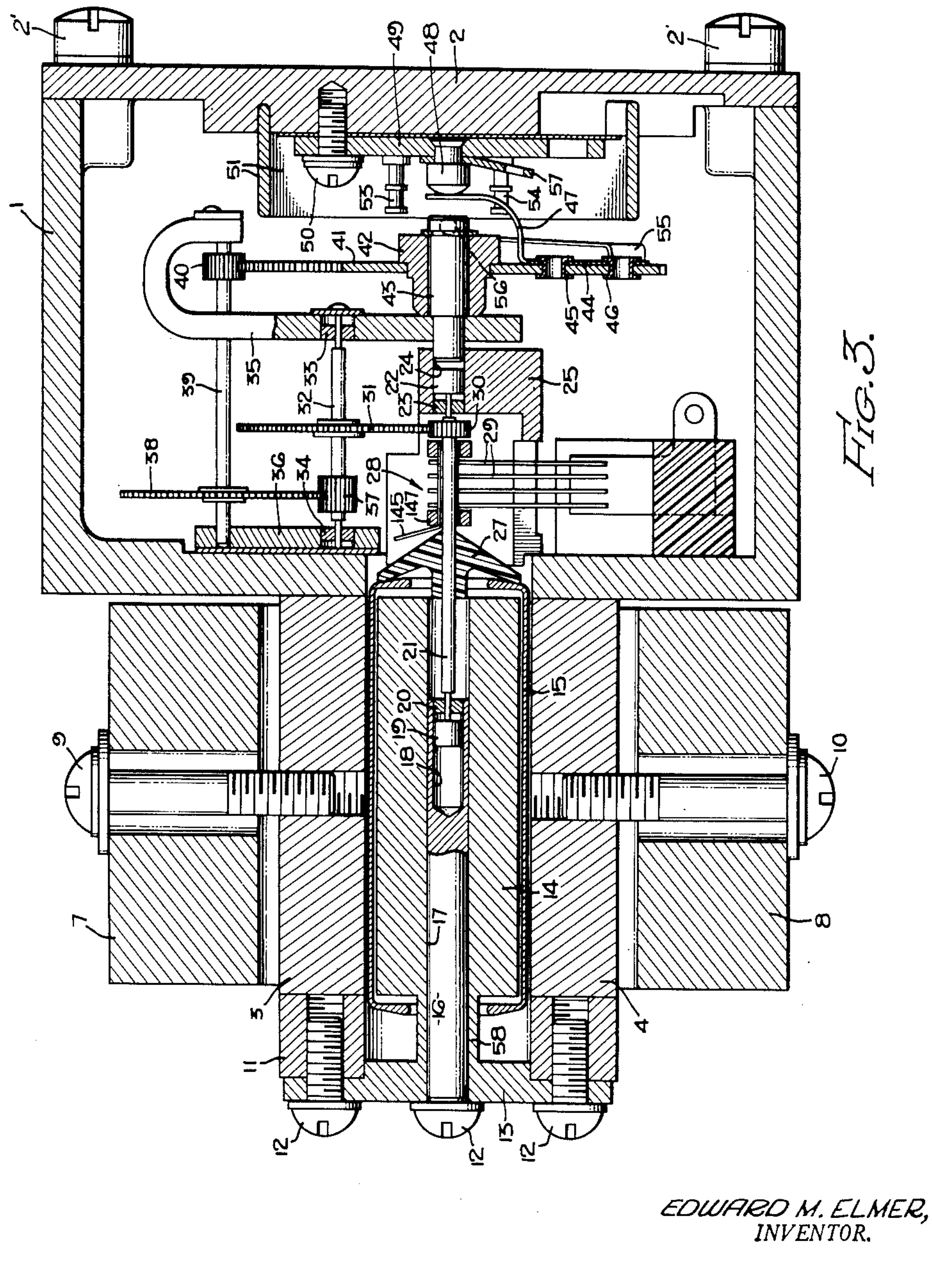
Fig. 3 is a vertical view along line 3—3 of Fig. 2 showing the construction of the armature and the gear system.
Figures 4, 5:
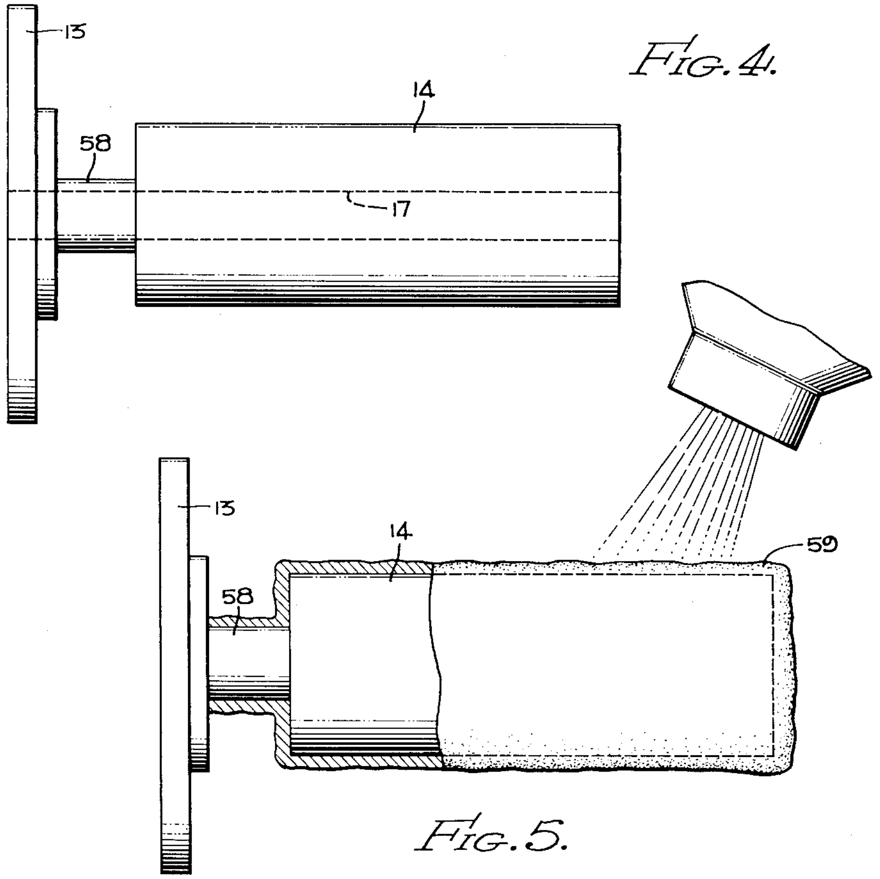
Fig. 4 is a plan view of the iron core for the integrating motor.
Fig. 5 is a view partly in cross section of the iron core of the motor in the process of being covered by sprayed aluminum.
Figure 6:
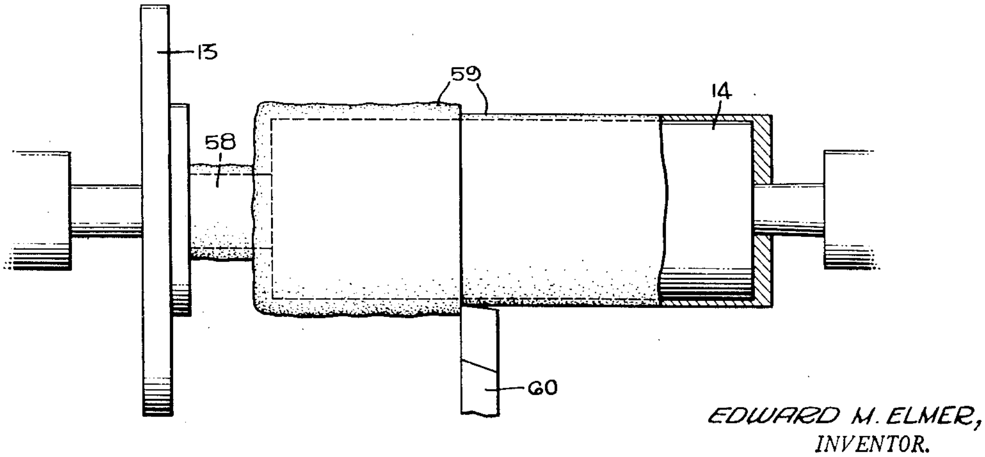
Fig. 6 is a view of the iron core with its aluminum shell partly machined.
Figure 7:
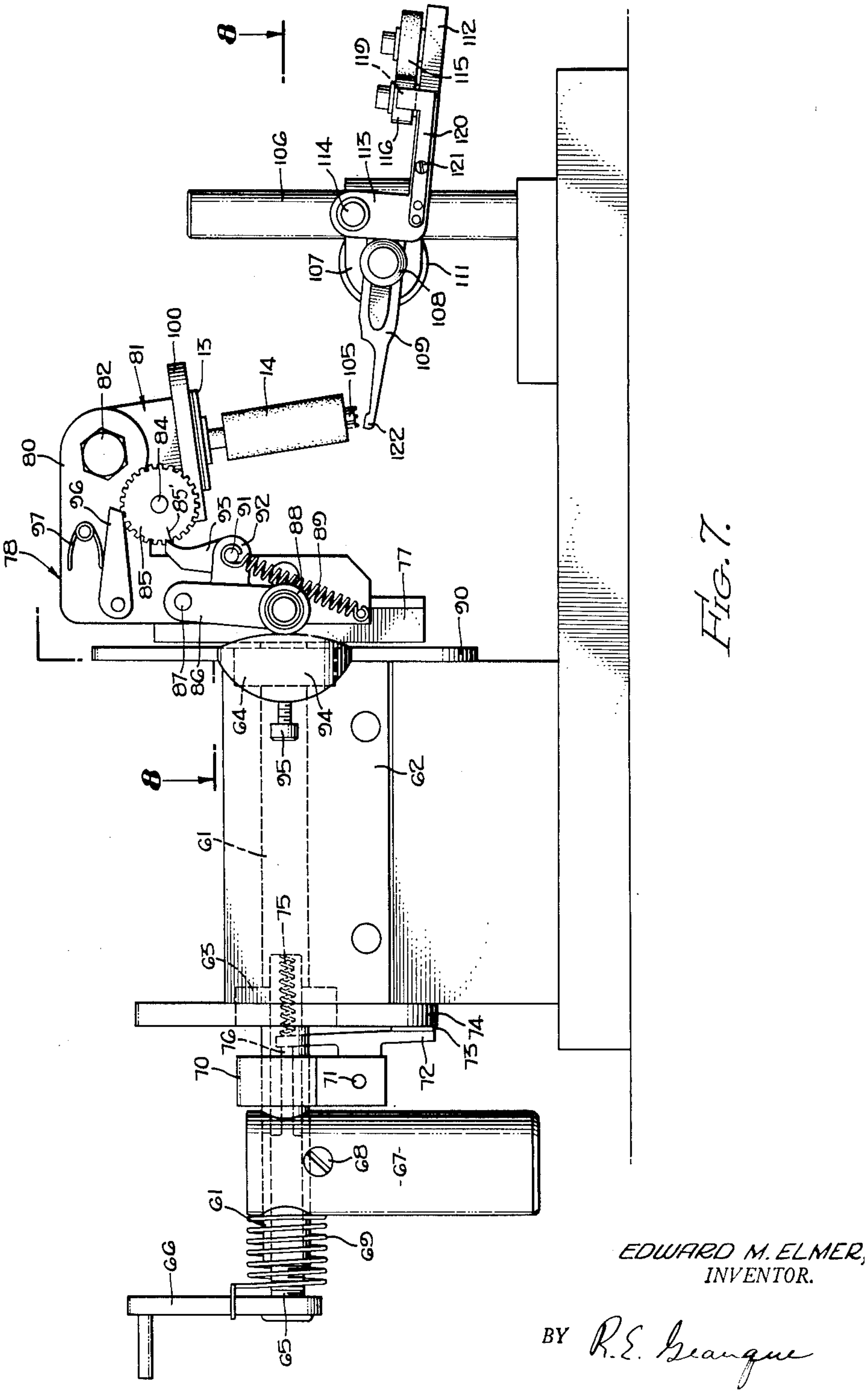
Fig. 7 is a side elevational view of the winding machine utilized to apply the motor windings to the aluminum covered core and showing the core in position relative to the winding quill.

The method of constructing the armature for this low inertia motor will now be described. The core 14 is comprised of a soft iron material and is constructed, as illustrated in Figure 4, with a center opening 17 which passes along the axis of the core and through back plate 13 and extension 58, which connects the back plate with the body of the core. The first step in the formation of the armature comprises spraying an aluminum material 59 onto the surface of the core in the manner illustrated in Figure 5. After this sprayed material is deposited unevenly upon the core, the surface of the material is cut away by tool 60 to leave a thin, smooth layer of aluminum on the sides and ends of core 14, which layer will be exactly concentric with the axis of core 14. The core, as coated with this thin, even layer of aluminum (or some other suitable rigid material) is then ready for mounting in the winding machine of this invention.

This winding machine is illustrated in Figures 7 to 15 and has a shaft 61 which is supported in frame 62 by bearings 63 and 64. One end of the shaft is threaded to receive screw 65, which has handle 66 rigidly fastened thereto, and a counterweight 67 is also secured to the shaft by screw 68. A coil spring 69 surrounds shaft 61 and has one end secured to counterweight 67 and the other end bearing against handle 66 so that when the handle 66 is not in use, the screw 65 will be moved some distance out of the end of shaft 61. The shaft 61 carries a bracket 70 which pivotally mounts, by means of pin 71, a braking arm 72 which carries a friction pad 73 in position to bear against braking disc 74 carried by frame 62. One end of the braking arm projects into an opening (not shown) in shaft 61, and this arm is normally biased by coil spring 75 located in shaft 61 so that the pad 73 presses against disc 74 to brake shaft 61. When the handle 66 is rotated to move screw 65 into the end of shaft 61 and thereafter rotate shaft 61, the end 76 of screw 65 will move braking arm 72 and will position pad 73 away from disc 74 so that there will be no braking action on shaft 61 during rotation of this shaft by handle 66.

The end of shaft 61 adjacent to bearing 64 carries a mounting member 77 which is positioned in a groove in frame 78 so that the frame 78 can be moved on member 77 and locked in any desired position. This frame 78 has two arms 79 and 80, and a gear support 81 is secured to these arms by bolts 82. The support 81 mounts a worm gear 83 on a shaft 84, and a gear 85 is secured to this same shaft in a position exterior of arm 80. A ratchet arm 86 is pivotally mounted by pin 87 on frame 78 and carries a roller 88 which is continually biased by spring 89 toward disc 90 integral with frame 62. One end of spring 89 is secured to frame 78 and the other end is carried by a pin 91 in extension 92 of arm 86. The pin 91 likewise pivotally mounts the pawl 93 and this pawl is continually biased into contact with gear 85 by a spring (not shown).

A cam 94 is secured to the edge of disc 90 by means of screw 95 (see Figure 8) and as the frame 78 is rotated by shaft 61, the roller 88 will ride up over cam 94 once during each revolution of frame 78. When this happens, pawl 93 will move gear 85 and shaft 84 the distance of one tooth. An arm 96 is pivotally mounted on frame 78 and continually forced into contact with gear 85 by the pressure of spring 97. This arm 96 serves to lock shaft 84 when it is not being moved by pawl 93. The gear support 81 has an extension 98 with an opening for receiving hollow shaft 99 of winding platform 100. The shaft 99 likewise mounts a gear 101 located between the winding platform 100 and extension 98. A snap ring 102 retains the shaft 99 in extension 98 and allows rotation of platform 100 by gear 101. A plug 103 is secured in shaft 99 and has an opening permitting screw 104 to pass through platform 100 and extend through opening 17 in core 14. A tying hub 105 has an extension 105′ positioned within opening 17, and this extension is threaded to receive screw 104. Thus screw 104 serves to securely fasten the core 14 to the winding platform 100, thereby causing it to rotate with platform 100 and gear 101. From the above description it is apparent that as the frame 78 is rotated by shaft 61, the cam 94 will cause the winding platform 100 and the core 14 to move around their axes the distance of one tooth in gear 85 after each bodily rotation of these elements by frame 78.

Figure 8:
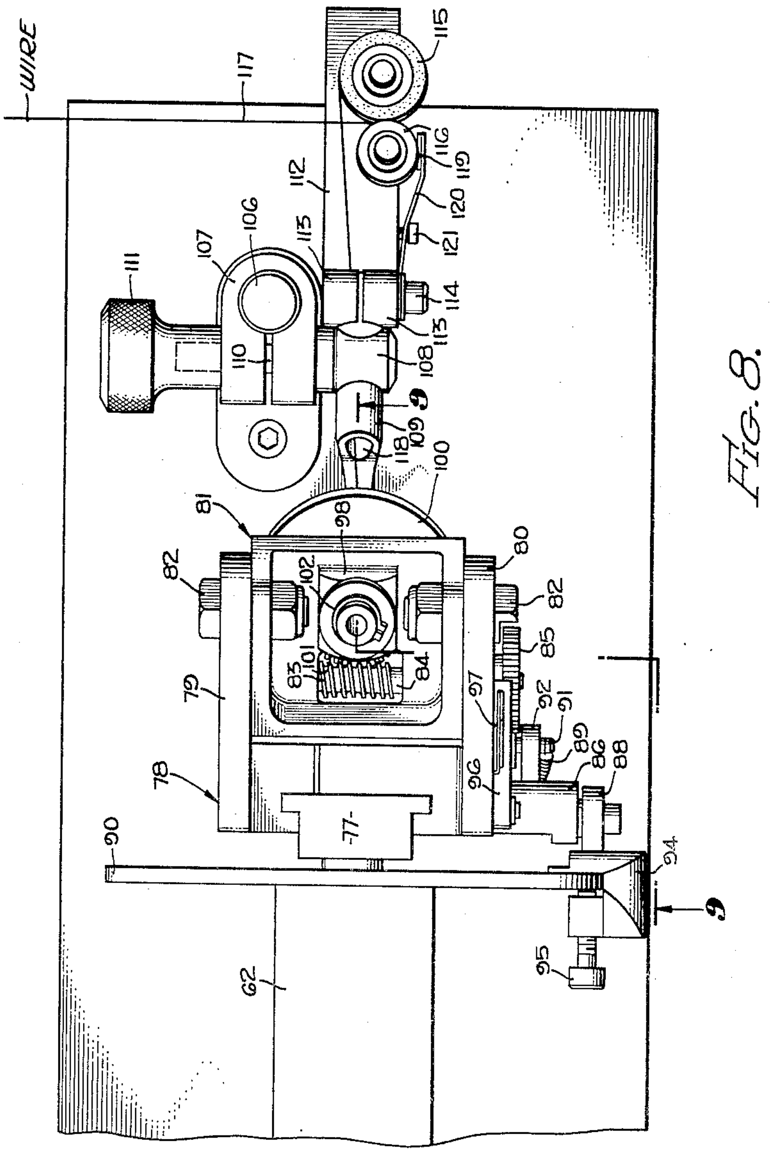
Fig. 8 is a horizontal plan view of the winding machine taken along line 8—8 of Fig. 7 illustrating the wire tensioning device and the gearing for the winding platform.

A stand 106 is secured to the base of the winding machine and carries a bracket 107 mounting a member 108. The winding quill 109 has a flat surface positioned within the member 108, and screw extension 110 of 108 passes through bracket 107 to connect with knob 111 so that the quill is securely held by stand 106. A platform 112 has a bracket comprised of two arms 113 which arms are secured around one end of quill 109 by screw 114. This platform carries a rubber guide roller 115 and a tension roller 116. The armature wire 117 passes between these two rollers and around roller 115 and thence to an opening 118 in the quill 109, as illustrated in Figure 8. A friction pad 119 is continually pressed against roller 116 by spring arm 120 secured to platform 112 by screw 121, and this friction pad serves to keep the rollers 115 and 116 from moving when armature wire is not being fed to the machine, and therefore the proper tension is maintained at all times on the armature wire.

The winding quill 109 has an enlarged section 122 formed at one end, which contains an eye 123 and which is stationary and positioned to feed the armature wire onto the core 14 as it is rotated by shaft 61. The tying hub 105 has a series of five slots 124, 125, 126, 127, 128 which connect with the center opening 129 of the tying hub, and these slots are positioned exactly 72 degrees apart. Also, the hub 105 carries a series of five pins 130, 131, 132, 133, 134 which are positioned opposite each one of the slots and are therefore likewise positioned 72 degrees apart.

Figure 9:
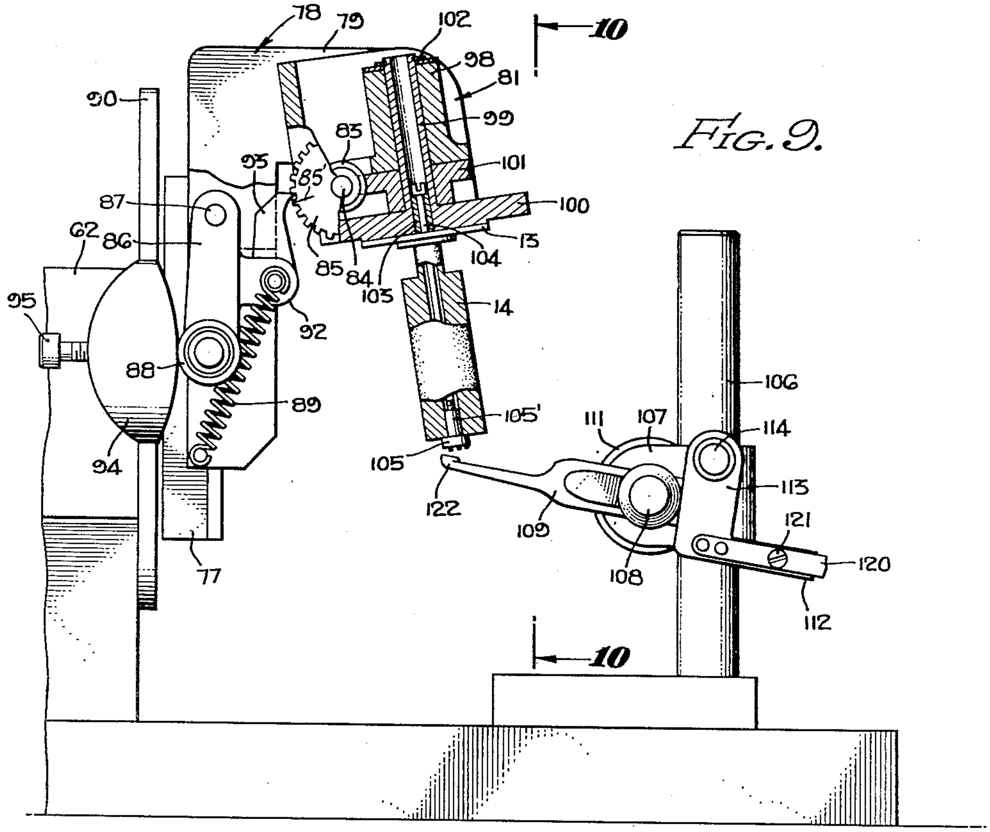
Fig. 9 is a vertical sectional view along line 9—9 of Fig. 8 illustrating the manner in which the armature is mounted on the winding platform and the operation of the feed cam for the winding platform.
Figure 10:
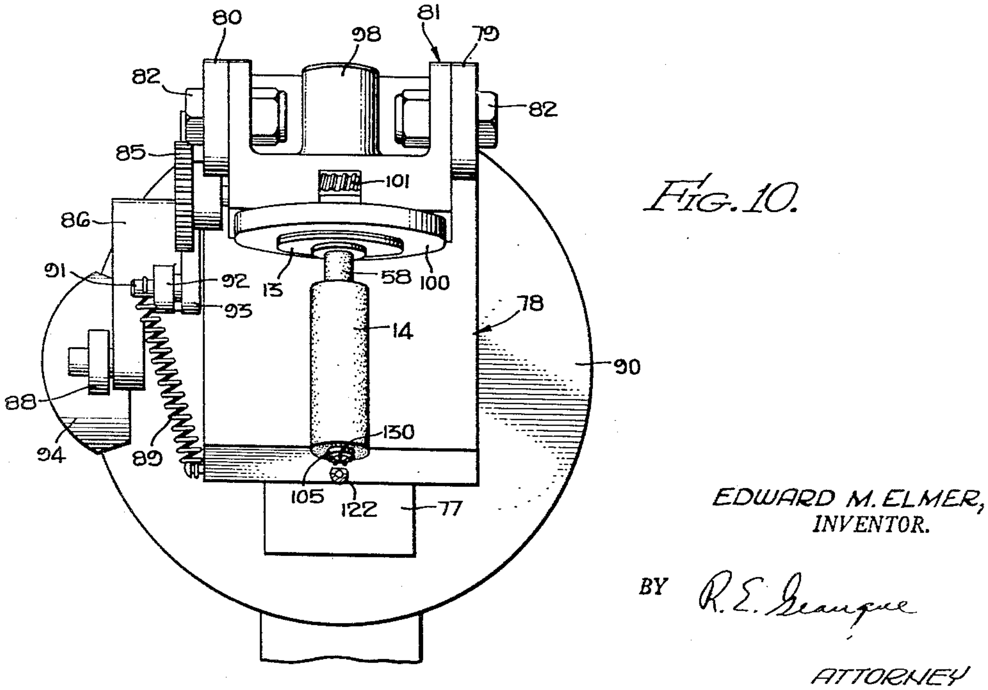
Fig. 10 is a vertical view taken along line 10—10 of Fig. 9 showing the winding quill in position for starting the winding of the core.
Figure 11:
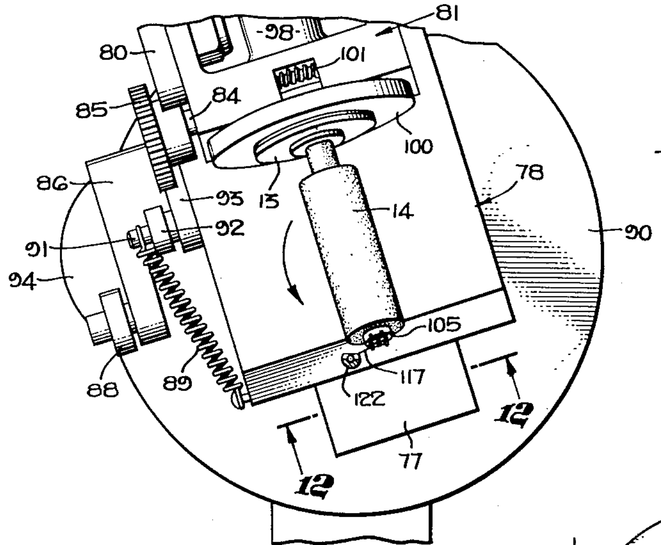
Fig. 11 is an end elevational view of the quill and core in position to start winding and with the wire attached to the tying hub.

When it is desired to start the winding of core 14, the core is first positioned relative to the eye 123 in the manner illustrated in Figures 9 and 10. It is pointed out that the core is mounted by winding platform 100 so that the axial line of shaft 61 passes through the center of the core, and the end 122 of the quill is positioned a slight distance below the tying hub end of the core. Therefore, as the core is bodily rotated the quill will clear both ends of the core by an equal amount. The armature wire is led through eye 123 and is looped around pin 130, but it is understood that the winding can start with any of the pins. To position the tying hub for receiving the winding, the slot 124 in this example is positioned parallel with the axis of shaft 61 so that the armature wire can be led through slot 124 to pin 130. The wire is now in position so that the handle 66 can be turned to wind the core. The position of the coil relative to the quill after a small increment of rotation of shaft 61 is illustrated in Figure 11, and it will be noted that the core starts its movement transverse to the end 122 of the quill in the direction shown by the arrow. Thus the armature wire 117 will be held by groove 124 in the manner illustrated in Figure 12 and the wire will be positioned along the end of core 14.

It will be noted that the axis of core 14 is tilted relative to vertical and inclined to the axis of shaft 61 by an amount which will allow the end 122 to pass on one side of tying hub 105 and on the opposite side of extension 58 during continuous rotation of handle 66. Therefore, after one-half revolution of handle 66, the armature wire and eye 123 will be positioned in the manner illustrated in Figures 14 and 15 wherein the extension 58 is positioned between the eye 123 and disc 90. Upon further rotation, the wire will pass across the end of the core 14 carrying extension 58 and will return along the side of the core to its original starting position. Thus the first loop of wire 117 around the core 14 is illustrated by section 135 of the wire, as shown in Figure 16.

After each revolution of handle 66 the core will be turned about its own axis a distance equal to the diameter of the armature wire by the pawl 93. The direction of this movement is indicated by the arrow in Figure 16, and it will be seen that individual coils of the wire will be placed adjacent to each other during rotation of the handle 66. An index line 85′ is carried by gear 85 to indicate to the operator the amount of revolution of the core about its axis. After the core has been rotated 72 degrees by pawl 93 (see Figure 16), the end of the wire will be passed through slot 128 and looped around pin 134, as illustrated in Figure 17, and then the winding operation will continue until the core 14 has been rotated another 72 degrees, or a total of 144 degrees, as shown in Figure 17. At this time the end of the armature wire will be passed through slot 127 and around pin 133 and the winding operation continued for another 72 degrees, at which time the end of the armature wire will be passed through slot 126 and around pin 132. After another 72 degrees of rotation, the end of the wire will be passed through slot 125 and looped around pin 131, and after the final 72 degrees of rotation, the end of the wire will be brought back through slot 124, looped around pin 130 and tied to the starting end of the wire. After the armature has been completely wound, the manner in which the armature wire is retained by pins 130, 131, 132, 133, 134 is shown in Figure 18.

The portions of the wire passing around each of the pins are thereafter removed and twisted together in the manner illustrated in Figure 19 to form commutator leads 136. It is therefore apparent that the equivalent of five individual coils are formed by the armature wire as wound upon the core. After the commutator leads are formed, the armature shaft 21 is inserted in the opening 17 in the core and the armature hub 27 is secured to the armature winding by a plastic binding material 139. The hub contains a series of openings 140 through which the commutator leads 136 can pass to the commutator. In order to properly secure the armature shaft to the armature winding, the core 14 and the winding are placed in fixture 141 which has a rod 142 inserted in opening 17 and a rod 143 inserted in an opening in the fixture. Each of these rods has an end opening for receiving the reduced ends of the armature shaft, and these rods position the armature shaft so that it will be truly concentric with the core 14 and the winding 15. Also, the rod 143 can apply a sufficient pressure between the armature hub 27 and the winding to provide for proper connection between the hub and the winding.

After the armature shaft has been assembled, the armature and core assembly is placed in a caustic etching bath 144 and the aluminum or other materials used for coating the armature is removed by the etching solution, as illustrated in Figure 22. After all the coating material has been removed, it is apparent that the armature 15, as illustrated in Figure 23, will be free to move relative to the core 14. The commutator is next assembled on the end of shaft 16 and consists of five commutator bars 145 secured to insulating cylinder 146 by means of insulating rings 147. The complete finished armature, including the winding 15 and the commutator, is illustrated in Figure 26, and Figure 25 discloses the manner in which each lead 136 is secured to a commutator bar 145. Each commutator bar is positioned relative to the winding so that the individual sections of the armature winding which are opposite the magnetic poles 5 and 6 will be energized when they are positioned within the field of poles 5 and 6. The completed armature which has been described is now ready for assembly into the motor in the manner which has been previously described and the motor will operate in the same manner as the motor described in the previously mentioned patent application since the five equally spaced coils are connected together in a similar manner. It is pointed out that while the armature assembly is held in the fixture 141, the armature 15 is impregnated with a suitable non-magnetic material, such as a plastic material, in any usual manner, and the armature can then be baked if necessary to set this material. By so impregnating the winding, the plastic will help to retain the individual loops of wire in correct position and will help to support the winding when it is mounted by cantilever bearings. Since the loops of armature wire are overlapped during winding, the armature is to some extent self-supporting and the winding is impregnated to insure that the armature will be rigid and completely self-supporting when supported from one end by shaft 21.

By utilizing a material for uniformly coating the core of the armature, which can later be completely removed from the core without damage to the armature winding or the core, it is possible to provide an expendable armature assembly which can be easily produced and which will have the armature winding exactly concentric with the core. Also, by applying the armature shaft to the armature winding prior to the time the coating material is removed, it is possible to position the armature shaft concentric with the core so that the air space between the core and the armature winding will be uniform. Since the indvidual loops of the winding are overlapped to more or less support themselves and are impregnated wtih a plastic material for further support, it is possible to support the armature from one end by cantiliver bearings. Also, because of the fact that there is no magnetic material in the armature itself, there will be no eddy current loses, and the friction loses will be reduced to a minimum because the armature can be suspended on very small bearings.

The motor of this invention has a number of uses because of its high torque-to-inertia ratio and minimum of other usual motor losses. It is understood that other types of motor windings can be placed on core 14 by changing the number of coil sections and commutator leads to provide the desired armature field for any motor construction. Also, any suitable type of rigid material for coating the core can be used, provided it can be later removed without injury to the core or armature winding. Various other modifications may obviously be resorted to by those skilled in the art without departing from the spirit or scope of the invetnion, as set forth in the appended claims.

What is claimed is:

1. A method of forming a motor armature and core assembly, comprising the steps of coating the core with a uniform layer of rigid material, winding the armature around said rigid material while leaving an opening in said armature at one end for receiving the supporting means for said core, attaching rotatable supporting means to said armature to rotatably support the armature coaxially with said core, and removing said uniform layer of rigid material from between the armature and the core to permit rotation of the armature relative to the core while maintaining a uniform air gap between the core and the armature.

2. A method of forming an armature and core assembly comprising coating a core of magnetic material with a uniform layer of rigid material of greater hardness than the armature winding, winding the armature around said rigid material while leaving an opening in each end of said armature, the opening at one end receiving stationary supporting means for said core, attaching rotatable supporting means to the other end of said armature to rotatably support the armature coaxially with said core, impregnating said armature with a non-magnetic binding material to help support said armature, and removing said uniform layer of rigid material from between the armature and the core to permit rotation of the armature relative to the core while maintaining a uniform air gap between the core and the armature.

3. A method of forming an armature and core assembly comprising coating a core of magnetic material with a uniform layer of metallic material, winding the armature around said metallic material in a symmetrical manner while leaving end openings in said armature, the opening in one end receiving stationary supporting means for said core, attaching rotatable supporting means to the other end of said armature to rotatably support said armature coaxially with said core, impregnating said armature with a non-magnetic binding material to help make the armature self-supporting, and thereafter placing said armature and core in an etching bath to remove the layer of metallic material from between said armature and said core and provide a uniform air gap therebetween.

4. A method of forming an armature and core assembly comprising the steps of applying a uniform layer of rigid material to a cylindrical core having concentric supporting means extending at one end thereof, winding said armature around said rigid material so as to provide a concentric opening in each end of said armature one of which receives said supporting means, providing an armature support shaft positioned co-axially with said armature and core, securing said shaft to the end of said armature opposite the end receiving said supporting means in order to hold said armature coaxially with said core upon rotation of said armature, impregnating said winding with a non-magnetic binding material to help support said armature, and thereafter removing said uniform layer from between said armature and said core to permit rotation of the armature relative to the core and provide a uniform air gap between the core and the armature.

5. A method of forming an armature and core assembly comprising the steps of applying a layer of rigid material to a cylindrical core having concentric supporting means extending at one end thereof, smoothing said material to provide a uniform layer of said material upon the core, winding the armature around said rigid material to cover the cylindrical surface while leaving a concentric end opening in each end of said armature one of which receives the supporting means, providing a shaft with a flange positioned adjacent the end of the armature opposite the supporting means for the core, securing the flange to the end of the armature by means of a non-magnetic bonding material to rotatably support the armature coaxially with the core, and then removing the layer of material from between the armature and the core to provide a uniform air gap therebetween.

6. A method of forming an armature and core assembly comprising the steps of applying a rigid metal coating to a hollow magnetic core, producing an accurately machined surface on said coating to determine the air gap, winding a coil on said core to cover the cylindrical surface and the end surfaces except for the central portions thereof, providing a shaft with a flange having radially spaced apertures therein, securing the shaft within the core and securing the flange to the adjacent end winding by means of a plastic bonding material and then etching to remove only the rigid metal coating.

7. A method of forming an armature assembly comprising the step of applying a uniform layer of rigid material to a substantially cylindrical member formed of magnetic material, winding the armature around said rigid material while leaving an opening in said armature at one end for receiving the supporting means for said member, attaching rotatable supporting means to said armature to rotatably support the armature coaxially with said member, and removing said uniform layer of rigid material from between said armature and said member to permit rotation of the armature relative to the member while maintaining a uniform air gap between the member and the armature.

8. A method as defined in claim 7 including the step of treating said armature with a non-magnetic binding material to help support said armature.

9. A method as defined in claim 7 wherein said applying step comprises the step of applying a uniform layer of metallic material to the cylindrical member.

References Cited in the file of this patent

UNITED STATES PATENTS

| | | |
|---|---|---|
| 295,368 | Dennis | Mar. 18, 1884 |
| 653,957 | Henricks | July 17, 1900 |
| 829,801 | Pratt | Aug. 28, 1906 |
| 1,796,556 | Boitel | Mar. 17, 1931 |
| 2,352,055 | Witt | June 20, 1944 |
| 2,352,737 | Roosa | July 4, 1944 |

FOREIGN PATENTS

| | | |
|---|---|---|
| 11,242 | Great Britain | of 1889 |
| 181,262 | Great Britain | June 15, 1922 |
| 867,162 | France | July 7, 1941 |
| 119,588 | Australia | Mar. 1, 1945 |
| 123,423 | Australia | Jan. 24, 1947 |
| 285,908 | Switzerland | Feb. 2, 1953 |